United States Patent [19]
Close

[11] Patent Number: 4,799,000
[45] Date of Patent: Jan. 17, 1989

[54] DISPLAY CONTROL APPARATUS

[75] Inventor: Ernest F. Close, Fort Wayne, Ind.

[73] Assignee: Magnavox Government and Industrial Electronics Company, Fort Wayne, Ind.

[21] Appl. No.: 913,768

[22] Filed: Sep. 30, 1986

[51] Int. Cl.$^4$ .......................................... H01J 29/56
[52] U.S. Cl. ..................................... 315/371; 315/367
[58] Field of Search .............. 315/371, 370, 382, 368, 315/367

[56] References Cited

U.S. PATENT DOCUMENTS

| | | | |
|---|---|---|---|
| 4,054,907 | 10/1977 | Itoh et al. | 358/60 |
| 4,087,835 | 5/1978 | Nishimura et al. | 358/60 |
| 4,095,137 | 6/1978 | Oswald | 315/367 |
| 4,099,092 | 7/1978 | Bristow | 315/367 |
| 4,127,849 | 11/1978 | Okor | 364/522 |
| 4,203,051 | 5/1980 | Hallett et al. | 315/367 |
| 4,225,940 | 9/1980 | Moriyasu et al. | 315/367 |
| 4,232,311 | 11/1980 | Agenta | 340/703 |
| 4,240,073 | 12/1980 | Seats et al. | 340/703 |
| 4,297,691 | 10/1981 | Kodama et al. | 340/723 |
| 4,303,912 | 12/1981 | Stafford et al. | 340/703 |
| 4,386,345 | 5/1983 | Narveson et al. | 340/703 |
| 4,410,841 | 10/1983 | Dusard et al. | 315/382 |
| 4,437,093 | 3/1984 | Bradley | 340/703 |
| 4,473,844 | 9/1984 | Klein | 358/163 |
| 4,687,973 | 8/1987 | Holmes et al. | 315/371 |

FOREIGN PATENT DOCUMENTS

| | | |
|---|---|---|
| 0163443 | 12/1985 | European Pat. Off. . |
| 0166254 | 1/1986 | European Pat. Off. . |
| 1353147 | 5/1974 | United Kingdom . |
| 2040646 | 8/1980 | United Kingdom . |

Primary Examiner—Theodore M. Blum
Attorney, Agent, or Firm—T. A. Briody; W. J. Streeter; R. T. Seeger

[57] ABSTRACT

Horizontal and vertical deflection windings in a deflection yoke coil assembly of a CRT (cathode ray tube) having stroke written or raster scan displays are driven by x and y analog deflection signals, respectively. Each of the x and y analog deflection signals are converted to x and y digital signals, respectively, sampled to provide x, y sample sets which are coupled to a digital x correction signal memory and a digital y correction signal memory, respectively. Geometric corrections are stored in the memories for each of a predetermined number of x, y signal set values which correspond, respectively, to a number of point locations over the CRT screen. The x and y corrections that are addressed from the memories are supplied to MDACs (multiplying digital to analog converters) and then to analog delay line filters which supply the x, y analog correction signals for summing with the x, y analog deflection signals, respectively. The x and y digital signals are also coupled to separate astigmatism, dynamic focus, shading and convergence memories which are coupled to DACs (digital to analog converters) and then to respective CRT controls or associated circuitry.

15 Claims, 3 Drawing Sheets

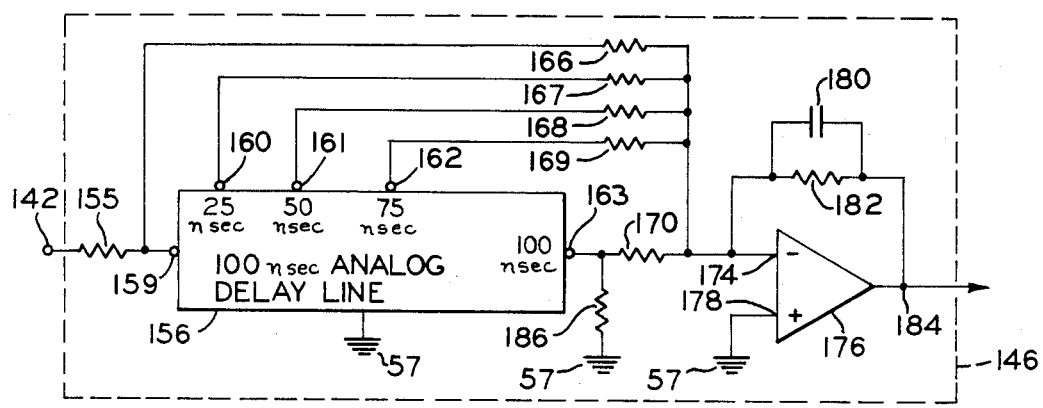
FIG. 2
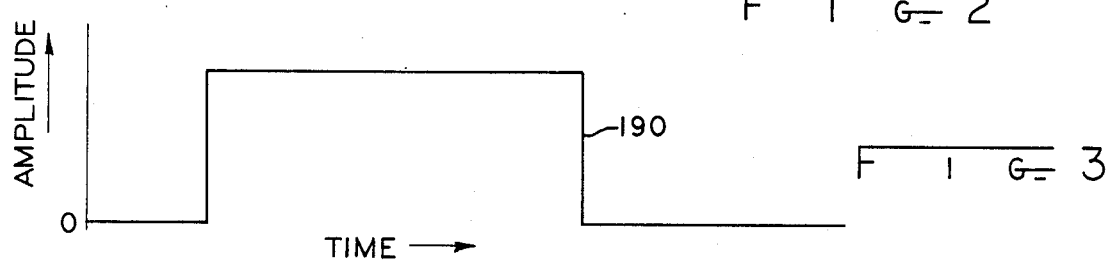
FIG. 3
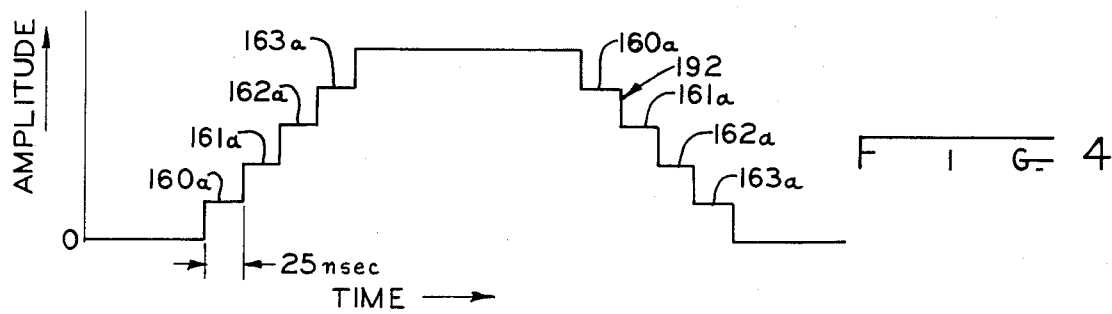
FIG. 4
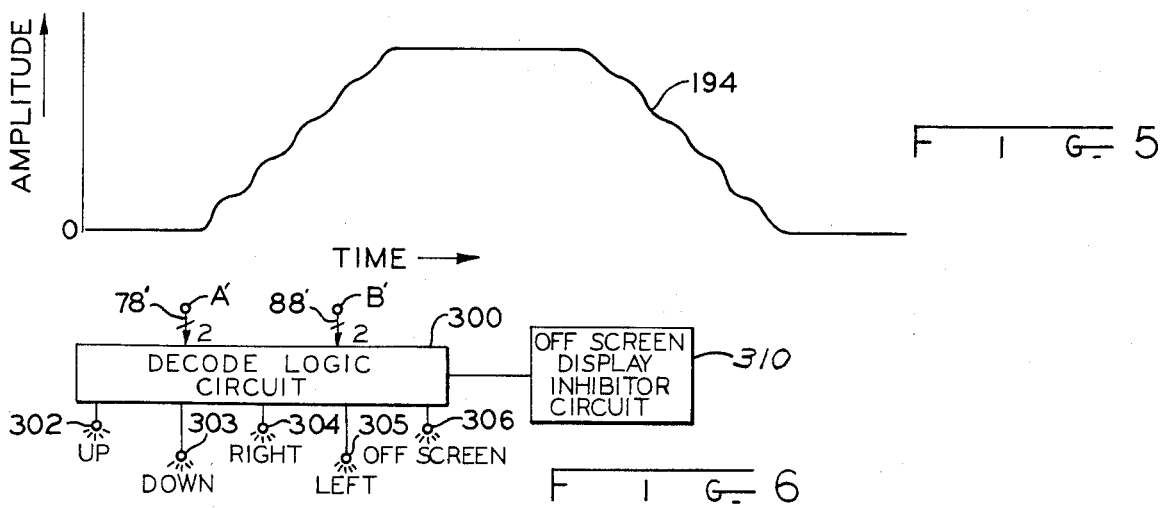
FIG. 5
FIG. 6

DISPLAY CONTROL APPARATUS

BACKGROUND OF THE INVENTION

1. Field of the Invention

This invention is in the field of CRTs (cathode ray tubes) and more particularly to controls for providing signals and corrections for controlling the CRT display.

2. Description of the Prior Art

CRTs characteristically have display distortions including geometric, astigmatism, focus, shading and/or convergence distortions. As used herein, "geometric" corrections are those corrections necessary to place a point displayed on the screen at the exactly correct horizontal and vertical coordinates. Numerous efforts have been made to provide corrections and signals for distortionless CRT displays. The disclosures in the following U.S. Pat. Nos. are representative of such efforts: 4,095,137; 4,240,073; 4,386,345; and 4,410,841. While these systems attempt to provide distortion correction signals and distortionless signals based on data stored in memories, the manner in which the data are stored and/or used in the display control system limit the versatility and application of these systems.

SUMMARY OF THE INVENTION

A CRT has an electron beam that is focussed and deflected to provide a display as is understood in the art. The horizontal and vertical deflection signals, also defined as the x and y deflection signals, respectively, for the CRT display are buffered, sampled at a high sampling rate and digitized and used to address one or more ROMs (read only memories) in which are stored correction data or signal data for each of a large number of point locations on the CRT display. The buffers provided for each of the x and y deflection signals each have scaling and centering adjustments that can be made for a one time setup. Typically for stroke written and raster scan CRT systems there is a separate ROM for geometric corrections of each of the x and y deflection signals. In addition a separate ROM is provided for each group of astigmatism coils, the dynamic focus coil, shading in the video amplifier circuitry, and, if a color CRT is used, the convergence coils.

The ROMs are simultaneously addressed by the x and y digital signals. The addressed digital corrections or signals are clocked out by latches at the sampling rate and converted to analog signals. The x and y digital geometric corrections are converted to analog corrections by MDACs (multiplying digital to analog converters) which are coupled to the x and y deflection signal sources to provide a sliding reference to the MDACs resulting in smoothing the steps in the ROM sampled outputs. The outputs of the MDACs are buffered and processed by analog delay line filters that break down a large step to multiple smaller steps to further smooth the ROM sampled outputs and thus provide a substantially smooth continuous display which is especially important in stroke written systems.

The stepped nature of the sampled outputs of the remaining ROMs, e.g. those having astigmatism, dynamic focus, shading and convergence data, are not as objectionable as in the deflection correction data and therefore the aforementioned smoothing operations are not as critical.

An instantaneous beam current correction ROM is provided that effectively takes the product of an operator entered brightness setting and the writing rate in a stroke written system. The digital correction of this ROM is sampled by a strobed latch and then converted to an analog signal and summed with the dynamic focus signal to thus provide exact focus corresponding to x, y position and corrected for instantaneous beam current.

A decode logic circuit is provided having LEDs (light emitting diodes) to indicate when each of the x and y deflection waves are properly scaled and centered by means of one time adjustments to make maximum use of the CRT display. The decode logic also provides a signal for momentary offscreen signals for inhibiting the system during offscreen intervals.

It is therefore an object of this invention to provide a display control for a CRT that has improved fidelity, versatility and application.

An object of this invention is to digitally convert and sample the analog horizontal and vertical deflection signals to obtain digital x, y sample sets which are used to address a memory that stores digital corrections for a predetermined number of point locations spaced over the face of the CRT display, each sample set corresponding to a respective point location.

Another object of this invention is to provide a geometric correction from a digital memory to the analog horizontal and vertical deflection signals in a CRT for each of a predetermined number of point locations on the CRT display.

A further object of this invention is to provide in the apparatus of the previous object an MDAC at the output terminal of the digital memory to smooth the stepped output from the memory.

A still further object is to couple the output terminal of an MDAC of the previous object to an analog delay line filter to provide multiple small steps in place of each larger step in the output from the MDAC.

An object of this invention is to couple the x, y sample sets of the previous objects to memories that store data for at least one of astigmatism, dynamic focus, shading and convergence.

A still further object is to provide in the apparatus of the previous objects in both a stroke written display system and a raster scan system a beam current correction for the dynamic focus.

Another object is to provide in the apparatus of the previous objects an LED for each of the x and y digital signals to indicate full range operation to aid in system adjustment and to provide an offscreen signal to inhibit display data.

The above mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

FIG. 2 is a block diagram of an analog delay line and filter used in the embodiment of FIG. 1;

FIG. 3 is a waveform of a signal at the input of the filter shown in FIG. 2;

FIG. 4 is a waveform at the output terminal of the filter of FIG. 2;

FIG. 5 is a waveform similar to the waveform of FIG. 4 but with the capacitor in the FIG. 2 filter made larger; and FIG. 6 is a block diagram of a decode logic circuit and display inhibitor circuit for use in this invention and having connection points A', B' that are connected to points A, B, respectively, in FIG. 1A.

DESCRIPTION OF THE PREFERRED EMBODIMENT(S)

Figures 1A, 1C:
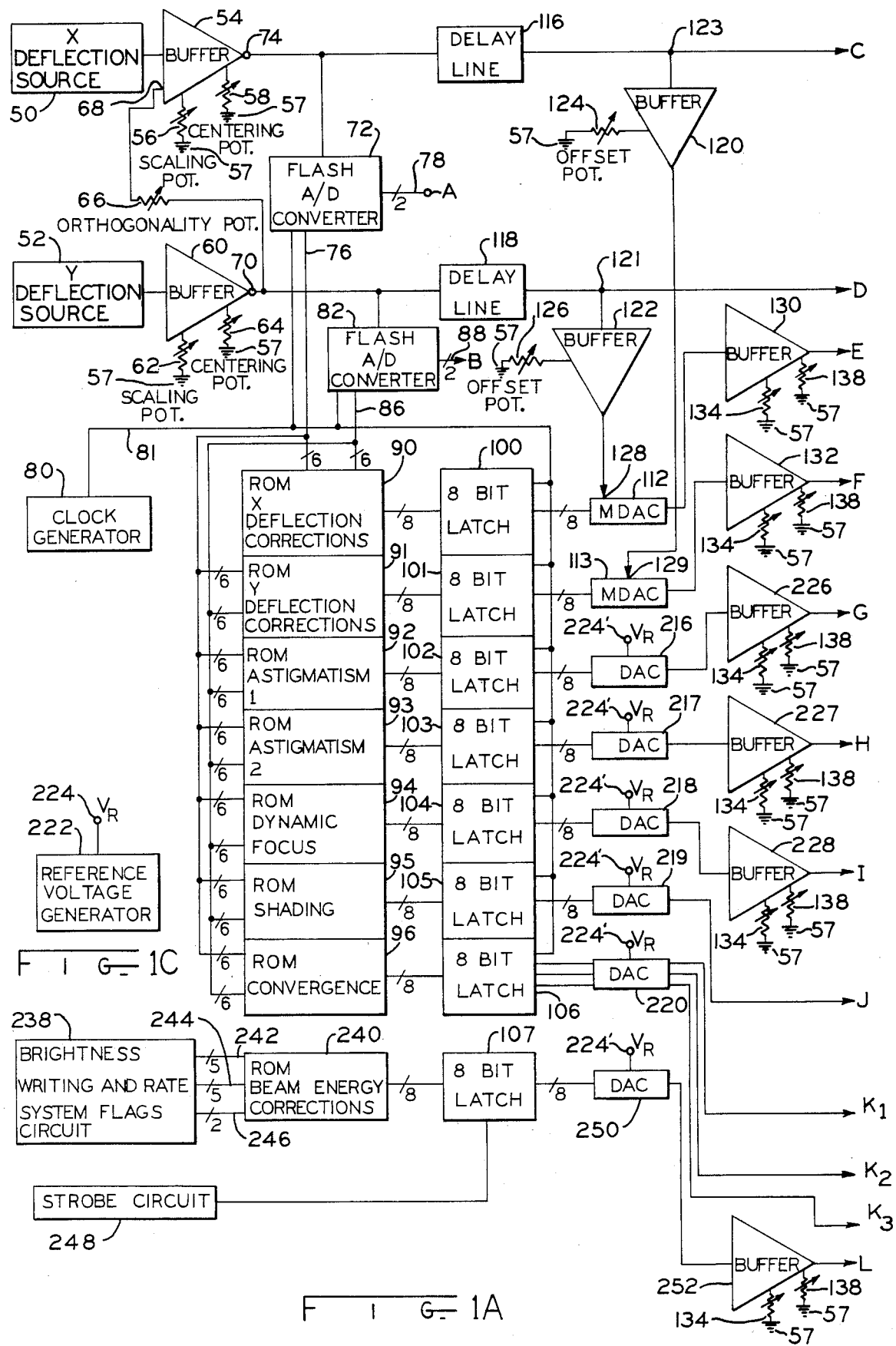
FIGS. 1A, 1B, collectively, show a block, partly schematic, simplified diagram of an embodiment of this invention, the connection points C-L in FIG. 1A being connected to points C'-L' in FIG. 1B, respectively.
FIG. 1C is a block diagram of a reference voltage generator for providing a reference voltage to terminals 224' in FIGS. 1A and 1B.
Figure 1B:
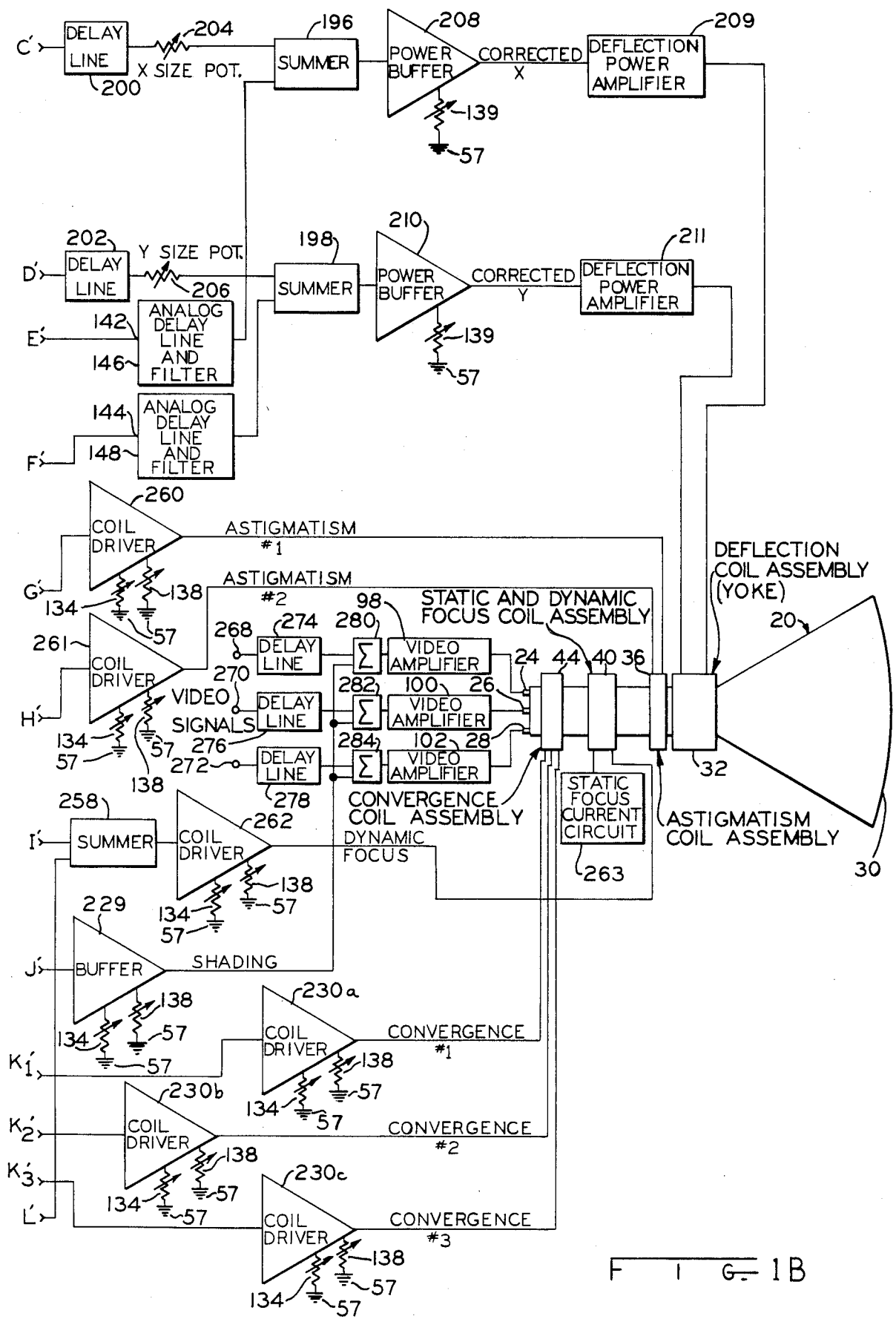

Referring to FIGS. 1A, 1B color CRT 20 has three electron guns 24, 26, 28 that emit electron beams for the red, green and blue phosphor dots, respectively, on CRT screen or display 30 as is understood in the art. x and y deflection coil group 32, astigmatism nos. 1 and 2 coil assembly 36, static and dynamic focus coil assembly 40, and red, green and blue convergence coil assembly 44 are all positioned about neck 46 of CRT 20 in conventional manner for a three gun color CRT although other type CRTs may be used.

x deflection source 50 and y deflection source 52 provide analog x, y signals respectively for the horizontal and vertical deflection, respectively, of the electron beams from guns 24, 26, 28. Source 50 is coupled to buffer 54 having scaling potentiometer 56 returned to ground 57 for a one time setup to match the x deflection amplitude to the horizontal dimension of screen 30. In the drawings, "potentiometer" is abbreviated as "POT." Source 52 is coupled to buffer 60 having scaling potentiometer 62 for a one time setup to match the y deflection amplitude to the vertical dimension of screen 30.

Orthogonality potentiometer 66 is coupled between input terminal 68 of buffer 54 and output terminal 70 of buffer 60 and provides for a one time setup for establishing orthogonality between the x and y signals as finally viewed on screen 30.

Flash A/D (analog to digital) converter 72 is a very high speed converter known to the art and is coupled to output terminal 74 of buffer 54 and converts the x analog deflection signal to a six bit digital signal on six parallel lines 76 and a two bit digital signal to terminal A for overflow and underflow indication on two parallel lines 78 at a 10 MHz clock or sampling rate provided by clock generator 80 which is coupled to converter 72 on line 81. Centering potentiometer 58, returned to ground 57, is coupled to buffer 54 for a one time setup to center the limits of the horizontal signal to suit the input requirements of converter 72 and scaling potentiometer 56, returned to ground 57, is coupled to buffer 54 to scale the buffer output to correspond to screen 30 dimensions. In the drawings parallel coupling lines are symbolized by a slash "/" and a numeral to indicate parallel lines of a number equal to the numeral. Other sampling rates may be used depending on the application and on the signal frequency.

Flash A/D converter 82 is a very high speed converter known to the art and is coupled to output terminal 70 of buffer 60 and converts the y analog deflection signal to a six bit digital signal on six parallel lines 86 and a two bit digital signal to terminal B for overflow and underflow signal on two parallel lines 88 at a 10 MHz clock or sampling rate provided by clock generator 80 which is coupled on line 81 to converter 82. Centering potentiometer 64, returned to ground 57, is coupled to buffer 60 for a one time setup to center the limits of the vertical signal to suit the input requirements of converter 82 and scaling potentiometer 62, returned to ground 57, is coupled to buffer 60 to scale the buffer output to correspond to screen 30 dimensions.

Lines 76, 86 carrying the digitized x, y signal amplitude information, respectively, from converters 72, 82, respectively, are coupled on six parallel lines to each of x deflection geometric correction ROM 90, y deflection geometric correction ROM 91, astigmatism 1 ROM 92, astigmatism 2 ROM 93, dynamic focus ROM 94, shading ROM 95, and convergence ROM 96. Additional ROMs for additional functions may be used. In the embodiment disclosed herein, each ROM 90-96 has 4096 eight bit data storage locations. Other size memories and other type memories, such as PROM (programmable read only memory) may be used for other applications.

Each x, y sample set of the digitized x, y signals corresponds to and is the address of a respective point location on screen 30 of the electron beam from each of guns 24, 26, 28. Thus in the embodiment disclosed there are 4096 different x, y sample sets and each sample set corresponds to and is the address of a respective point location on screen 30. Each x, y sample set addresses a corresponding geometric deflection correction in each of ROMs 90, 91; a corresponding astigmatism entry in each of ROMs 92, 93; a corresponding dynamic focus entry in ROM 94; a shading entry in ROM 95; and a convergence entry in ROM 96. The contents of ROMs 90-96 may be theoretically determined on mathematical bases or empirically determined as later described. In general, astigmatism relates to maintaining roundness of the dots on screen 30 and shading relates to brightness corrections to the video amplifier circuits 98, 100, 102 which are coupled to guns 24, 26, 28 respectively, which brightness corrections are typically required near the screen 30 edges due to CRT electronic lens limitations.

The eight bit parallel outputs of each of ROMs 90-96 are coupled by eight parallel lines to eight bit latches 100-106 respectively. Each of latches 100-106 receives a 10 MHz clock signal from generator 80 and provides a temporary memory storage of the most recent ROM output between clock signals to prevent transients from converters 72, 82 and ROMs 90-96 from distorting the ROM outputs.

Latches 100, 101 have an eight bit output on eight parallel lines to MDACs 112, 113 respectively. Delay lines 116, 118 are coupled to output terminals 74, 70 respectively and provide a predetermined delay to the x, y analog deflection signals respectively to exactly compensate for the processing time of the signals in converters 72, 82, ROMs 90-96 and latches 100, 101. The inputs of buffers 120, 122 are coupled to the output terminals of delay lines 116, 118 respectively, and buffer 120, 122 output terminals are coupled to terminals 128, 129 of MDACs 112, 113 respectively. Offset potentiometers 124, 126, each returned to ground 57, are coupled to buffers 120, 122 respectively and provide for a one time correction for any beam position offset on screen 30 due to DC (direct current) system errors. The output terminals of buffers 120, 122 are coupled to MDACs 112, 113 respectively to provide a sliding reference instead of a fixed reference in order to lessen the abruptness of the steps that are typical in a digital to analog converter. Without the smoothing compensation thus provided, the steps would be noticeable in any continuous line figure such as a circle.

The outputs of MDACs 112, 113 are supplied to buffers 130, 132, respectively, each of which has an amplitude or gain potentiometer 134 returned to ground 57 for a one time adjustment of the signal amplitude at the buffer output terminal and an offset potentiometer 138, also returned to ground 57, to provide for a one time correction for any beam position offset on screen 30 due to DC system errors. In the following description buffers, coil drivers and power amplifiers are provided with gain and offset potentiometers for one time adjustment corrections of signal gain and beam position centering respectively. Each gain potentiometer is labeled 134 and each offset potentiometer is labeled 138, both potentiometers being returned to ground 57. The outputs of buffers 130, 132 are supplied to input terminals 142, 144, respectively, of analog delay line and filters 146, 148 respectively which act to further smooth the analog corrections of the x, y deflection signals.

Referring to FIGS. 2–5, filter 146, shown in dashed box outline, will be described, it being understood that filter 148 is identical. Resistor 155 is coupled between terminal 142 and input port 159 of delay line 156 which in this example is a 100 nsec delay line having in succession 25 nsec delay port 160, 50 nsec delay port 161, 75 nsec delay port 162, and 100 nsec delay port 163. Delay line 156 is returned to ground 57. Resistors 166–170 couple ports 159–163 respectively to inverting (−) input 174 of operational amplifier 176, noninverting (+) input 178 being returned to ground 57. Capacitor 180 and resistor 182 are coupled in parallel in conventional manner between output terminal 184 and inverting terminal 174 of amplifier 176. Resistor 186 is coupled between output port 163 and ground 57 and properly terminates the delay line. In this example resistor 155 is 6 kohms, resistors 166–170 are each 4.7 kohms and resistor 186 is 100 ohms. Thus, the signal at each successive port 160–163 is delayed 25 nsec more than the signal at the next previous port for a given signal at input port 159.

Referring to the wave forms of FIGS. 3–5, the operation of filter 146 will be described. For explanatory purposes, wave form 190, FIG. 3, at terminal 142 is a square wave. After being processed by delay line 156, square wave 190 is transformed to stepped waveform 192, FIG. 4. Each step in waveform 192 is 25 nsec in duration, each vertical side of waveform 190 being converted into four steps 160a–163a since there are four delay ports 160–163 in line 156. By increasing the value of capacitor 180 steps 160a–163a are rounded and smoothed to obtain waveform 194, FIG. 5. Since the waveform from buffers 130, 132 have already been substantially smoothed, filters 146, 148 provide substantially completely smoothed x, y correction signal outputs, respectively, to summers 196, 198.

Referring to FIGS. 1A, 1B, delay lines 200, 202 are coupled in analog x, y deflection lines respectively to exactly compensate for the delays occasioned by signal processing in MDACs 112, 113, buffers 130, 132 and filters 146, 148. Delay line 200 is coupled between junction 123 and x size potentiometer 204 in the x deflection line. Delay line 202 is coupled between junction 121 and y size potentiometer 206 in the y deflection line. One time adjustments are made to potentiometers 204, 206 to fine tune the size of the x, y deflection signals, respectively, to match them to the dimensions of display 30.

The x, y deflection lines are coupled to summers 196, 198, respectively, where they are summed with x, y deflection correction signals from filters 146, 148, respectively. Summers 196, 198 are coupled to power buffers 208, 210 respectively, which have a gain of one, and each of which has centering potentiometer 139 returned to ground 57 for centering the x, y signals on display 30. The corrected deflection signal outputs of buffers 208, 210 are supplied respectively to deflection power amplifiers 209, 211 and thence to the windings in deflection coil 32.

The astigmatism, dynamic focus, shading and convergence functions are not as sensitive to the stepped analog outputs as is the deflection function and therefore DACs with fixed reference potentials instead of MDACs having a sliding reference potential may be used and analog delay line filters are not required.

ROMs 92–96 each have eight bit word digital outputs on eight parallel lines which are coupled to latches 102–106, respectively, which have eight bit word digital outputs supplied on eight parallel lines to DACs 216–220, respectively, where they are converted to analog waveform signals. Reference voltage generator 222 supplies a reference voltage, in this example 5.00 volts, at terminal 224 which is coupled to reference voltage terminal 224' of DACs 216–220. The analog output terminals of DACs 216–219 are coupled to buffers 226–229, respectively, each of which has an amplitude potentiometer 134 and an offset potentiometer 138 returned to ground 57.

Color video signals are applied to terminals 268, 270, 272, FIG. 1B, which are coupled to delay lines 274, 276, 278, respectively, to compensate for the delays occasioned by signal processing elsewhere in the circuit. The output terminals of delay lines 274, 276, 278 are coupled to summers 280, 282, 284 respectively which in turn are coupled to amplifiers 98, 100, 102 respectively.

The output from ROM 95 and hence of buffer 229 is applied to summers 280, 282, 284 for summing with the color video signals to control video amplifiers 98, 100, 102 so as to change video level, and hence brightness. The control function may be by simple addition to the video signals or by a product circuit for multiplying by the video signals to achieve the desired shading as is known in the art.

In powerful projection CRTs with high brightness it has been found that the CRT must be refocussed not only to account for the position of the beam on the screen but to account for the instantaneous beam current as well. Digital signals designating writing rate (in a stroke written CRT), which is supplied by the system supplying the deflection to the video signals, and operator brightness setting are each of five bit words supplied on five parallel lines by circuit 238 to ROM 240, which in this example also has 4096 data storage locations. The five bit brightness setting digital signal is supplied on five parallel lines 242 and the five bit writing rate digital signal is furnished on five parallel lines 244 to ROM 240. ROM 240 effectively takes the product of the brightness setting signal and the writing rate signal and applies a further curvature for each product that is stored in ROM 240 to correct for the focus v. beam current characteristic of the CRT system.

Also supplied by circuit 238 are operator entered two bit digital word flag signals on two parallel lines 246. These flags are for special purpose displays such as weather system displays where it is desired to defocus and blur parallel lines to depict a certain weather condition.

The digital focus correction signals from ROM 240 are eight bit digital signals supplied on eight parallel lines to latch 107. Strobe circuit 248 provides a strobe signal to latch 107 so that ROM 240 has time to be addressed and supply the stored correction signals to latch 107 without transient signal interference. The eight bit digital output of latch 107 is supplied on eight parallel lines to DAC 250 which is supplied at terminal 224' with a reference voltage from generator 222. DAC 250 supplies an analog signal to buffer 252 which has amplitude potentiometer 134 returned to ground 57 for a one time adjustment of the amplitude of buffer 252 output and offset potentiometer 138 returned to ground 57 to provide for a one time correction for any beam position offset on screen 30 due to DC system errors. The output terminals of buffers 252 and 228 are coupled to summer 258.

Buffers 226, 227 and summer 258 output terminals are coupled to coil drivers 260, 261, 262 respectively, each having a gain of one and each of which has gain potentiometer 134 and offset potentiometer 138, both potentiometers returned to ground 57. The output terminals of coil drivers 260, 261, are coupled to coil 36, and coil driver 262 is coupled to coil 40 to provide correct analog signals to the coils. Static focus current circuit 263 provides an operator adjusted static focus current to coil 40.

The three output terminals of convergence DAC 220 are coupled to coil drivers 230a, 230b, 230c respectively which in turn have their output terminals coupled to convergence coil assembly 44 for controlling the convergence of the beams of electron guns 24, 26, 28, respectively.

Referring to FIG. 6, decode logic circuit 300 has input terminals A', B' each of which has two parallel lines and which are coupled to terminals A, B respectively, FIG. 1A. Lines 78 are coupled to lines 78' and lines 88 are coupled to lines 88'. Indicator LED's 302-306 are coupled to circuit 300 and indicate respectively the "up", "down", "right", "left" and "offscreen" conditions of the beam on screen 30. Circuit 300 is known to the art and comprises less than a dozen simple gates that determine whether the A/D converters have "overflowed", i.e. all "1's" or "underflowed", i.e. all "0's." Indicator LED's 302-306 provide an indication of each possible condition.

If square waves of peak to peak amplitude to cause maximum desired deflection are impressed on the x and y inputs, the scaling and centering adjustments on the input buffers and coil drivers may be adjusted to just barely extinguish the "up", "down", "right", and "left" LED's. By this means the A/D converters are made to operate over their full range. These are setup adjustments that do not need to be reset. If any of the LED's are lighted, the input signal is too large or offscreen. Besides driving an LED, circuit 300 is coupled to off screen display inhibitor circuit 310 which is coupled into the preceding circuits in a manner known to the art in order to inhibit useless efforts to display data that are outside the viewing screen area and to protect the deflection amplifiers from being overdriven. An A/D converter having incorporated therein a decode logic circuit of the type disclosed herein is available from Telmos Inc., 740 Kifer Road, Sunnyvale, Calif. 94086 and having model no. 1070.

Circuits designed with the teaching of this invention are not hampered or limited by components which may limit the speed of operation. ECL (emitter coupled logic) digital devices or multiple digital channels operating on staggered times can be used to significantly raise the speed of operation. Very high frequency A/D converters, DACs and operational amplifiers all of which are commercially available and may be used to greatly increase the speed of operation and still maintain the accuracy and other advantages of the slower design. Also, the disclosed embodiment may be modified by adding or subtracting sections and channels, depending on the kind and number of functions desired.

The contents of ROMs 90-96, 240 may be derived from theoretical considerations or from an empirical approach of curve fitting of measured data. The latter approach accounts for all aberrations such as those due to lens, yoke, CRT, off-axis, and flat face imperfections and thus in general is more comprehensive than the theoretical approach. One method of empirical approach comprises generating a pattern of crosshatches, dots or small symbols on a regular grid through the system and comparing the resultant display with a geometrically accurate overlay that is fastened over the viewing screen. All ROMs are removed from the circuit and manual rotary switches substituted. All of the switches may be set at "half-way" position as a place to start, although it may later develop that a position closer to one end is better. Static adjustments are made to optimize performance at screen center, these involving focus coil position, static centering adjustments, and the like. The display will, over the rest of the screen, be out of shape and somewhat out of focus. If the process is started at the upper left corner of the screen, the switches may be adjusted to get exactly the position, focus, astigmatic correction and brightness desired at each of numerous points on the screen, the appearance of the rest of the screen being ignored during the adjustments for a particular point. The settings for each point are recorded as well as the digital output of the A/D converters for that point. Thus, the displayed pattern on the screen is made to exactly match at all points the accurate overlay, optimizing each function at each point. In this way, any interactions are also accounted for.

After a number of points, e.g. 50 or 100, have been compared the results may be tabulated and curves fitted through the points using a computer program or other means. Interpolations may be made to determine the complete ROM contents since it is impractical to manually determine each of the many, e.g. 4096, points where corrections are desired. When these results are placed in the ROMs, the circuit will automatically provide corrections for all points on the screen that have corresponding x, y signal set addresses in the ROMs, and not just for the relatively few points for which manual corrections were made.

In the analysis of the data obtained as above described, it may develop that the full sweep of the ROMs and DACs in one or more channels is not being fully used due to an incorrect starting point. The data may be proportionally expanded to more fully utilize the range of the digital circuits and the amplitude and offset analog adjustments used to correct the display itself. Of course, if the starting points are correctly chosen, such rescaling is unnecessary.

While there have been described above the principles of this invention in connection with specific embodiments, it is to be understood that this is by way of example and is not limiting of the scope of this invention.

What is claimed is:

1. Display control apparatus for use with a CRT having an electron gun beam and an electron beam activated screen, x and y analog signal sources for providing, respectively, horizontal and vertical deflection of the electron beam, and having at least one CRT display control member, that improvement comprising:
- memory means for storing and addressing digital data;
- first analog to digital converter means coupled between the x analog signal source and said memory means for converting the x analog deflection signal to a corresponding x digital deflection signal;
- second analog to digital converter means coupled between the y analog signal source and said memory means for converting the y analog deflection signal to a corresponding y digital deflection signal;
- sampling means coupled to said first and said second analog to digital converter means for simultaneously sampling each of the x and y digital signals, whereby an x, y digital sample set is provided from said first and said second analog to digital converter means; each of said sample sets corresponding to a respective predetermined point location on the screen; said point locations being spaced one from another over a predetermined portion of the entire viewed area of said screen;
- said memory means for storing digital data relating to at least one CRT display control member for each of said digital sample sets; said memory means for using said x, y digital sample sets to address said digital data;
- digital to analog converter means coupled to said memory means for converting said addressed digital data to corresponding analog signals;
- coupling means for coupling said digital to analog converter means to the display control member;
- whereby each of said digital sample sets provides an address for respective digital data in said memory means to provide real time geometrically corrected analog signals to the display control member.

2. The apparatus of claim 1 wherein said CRT display control member comprises the CRT horizontal and vertical deflection windings;
- said memory means comprising first memory means for storing digital geometric corrections to the x deflection signal for each of said x, y digital sample sets;
- second memory means for storing digital geometric corrections to the y deflection signal for each of said x, y digital sample sets;
- said digital to analog converter means comprising first and second digital to analog converter means coupled to said first and second memory means, respectively, for converting the x and y digital correction signals for each of said predetermined number of x, y signal set values to x and y analog correction signals, respectively;
- each of said first and second digital to analog converter means comprising a multiplying digital to analog converter means having a reference port; said reference ports of said first and second digital to analog converter means being coupled to said x and y signal sources respectively to provide a sliding reference to said first and second digital to analog converter means and to smooth the analog output from each of said first and second digital to analog converter means.

3. The apparatus of claim 1 including x and y analog signal sources and at least one CRT display control member; said x and y analog signal sources being coupled to said at least one display control member;
- delay line means being coupled between each of said x and y signal sources and said control member for delaying the analog signals from said x and y signal sources by a time delay substantially equal to the time required for the conversion between digital and analog signals and the digital signal processing.

4. The apparatus of claim 3 wherein said CRT display control member comprises a CRT horizontal and vertical deflection winding.

5. The apparatus of claim 1 wherein said sampling means comprises clock means coupled to said analog to digital converter means for providing a signal at a clock frequency to said analog to digital converter means to provide said x, y digital sample sets at said clock frequency from said analog to digital converter means.

6. The apparatus of claim 5 including latch means coupled between said memory means and said digital to analog converter means for providing a temporary memory storage for the most recent output from said memory means; said clock means being coupled to said latch means to couple signals between said memory means and said digital to analog converter means at said clock frequency; whereby transient signals and noise generated between the periodic intervals between clock signals are not coupled to said digital to analog converter means.

7. The apparatus of claim 2 including filter means coupled between each of said multiplying digital to analog converters and said horizontal and vertical deflection windings respectively for further smoothing the analog signals from said multiplying digital to analog converters;
- said filter means comprising an operational amplifier having inverting and noninverting inputs and an output, an input port and a plurality of delay line ports; the signal at each successive delay line port being delayed more than the signal at the next previous delay line port for a given signal at said input port; said delay line ports being coupled to said inverting input; a capacitor and resistor being connected in parallel and coupled between said operational amplifier inverting input and output.

8. The apparatus of claim 1 wherein said CRT display control member includes at least one of an electron beam deflection member, display dynamic focus control member, display shading control member, and electron beam convergence member.

9. The apparatus of claim 1 wherein said CRT display control member includes an electron beam deflection member, display dynamic focus control member, display shading control member, and electron beam convergence member.

10. The apparatus of claim 1 wherein said CRT display control member comprises a dynamic focus control member;
- means for receiving instantaneous writing rates and an operator entered brightness level and effectively obtaining the product of said brightness level and said writing rates;
- said memory means comprising means for storing focus correction digital data relating to said dynamic focus control member for each of said products; said memory means for using each of said products to address said focus correction digital data corresponding to said each of said products.

11. The apparatus of claim 1 including decode logic means coupled to said first and second analog to digital converter means for receiving said x, y sample sets and for providing signals indicating the maximum desired x and y deflection signals for scaling and centering of the x, y deflection signals so that said first and second analog to digital converter means operate over their respective full ranges.

12. The apparatus of claim 11 wherein said decode logic means is for providing a signal indicating the x, y deflection signals have exceeded said maximum deflection for said x and y deflection signals and for inhibiting CRT display during the period said maximum deflection signal is being exceeded.

13. The apparatus of claim 1 including means for providing an adjustment to obtain orthogonality between said x and y analog deflection signals.

14. The apparatus of claim 1 including means for providing buffering of the analog x and y deflection signal and for buffering signals from each of said digital to analog converter means.

15. Display control apparatus for use with a cathode ray tube having an electron gun beam and an electron beam activated screen and having horizontal and vertical deflection windings coupled to x and y analog deflection signal sources, respectively, that improvement comprising:

first memory means for storing digital geometric corrections to the x deflection signal for each of a predetermined number of x, y signal sets, each x, y signal set corresponding to a respective predetermined geometrically correct point location on the screen;

second memory means for storing digital geometric corrections to the y deflection signal for each of said predetermined number of x, y signal sets;

first analog to digital converter means coupled between the x analog signal source and each of said first and second memory means and for converting the x analog deflection signal to an x digital deflection signal;

second analog to digital converter means coupled between the y analog signal source and each of said first and second memory means and for converting the y analog deflection signal to a y digital deflection signal, so that an x digital correction signal is called from said first memory means for each x, y signal set and a y digital correction signal is called from said second memory means for each x, y signal set;

first and second digital to analog converter means coupled to said first and second memory means, respectively, for converting the x and y digital correction signals for each of said predetermined number of x, y signal sets to x and y analog correction signals, respectively;

first summing means coupled to said first digital to analog converter means and to the x analog signal source for summing said x analog correction signal to the x analog signal to provide a corrected x analog deflection signal;

second summing means coupled to said second digital to analog converter means and to the y analog signal source for summing said y analog correction signal to the y analog signal to provide a corrected y analog deflection signal;

whereby the x and y analog deflection signals are real time geometrically corrected to provide x and y analog signals to the x and y deflection windings respectively so that the x and y deflection windings will precisely position the electron gun beam at said respective predetermined geometrically correct point locations on the screen.

* * * * *